(12) United States Patent
Burns et al.

(10) Patent No.: US 6,739,925 B2
(45) Date of Patent: May 25, 2004

(54) HYDRODYNAMIC DEVICE

(76) Inventors: Steve Daniel Burns, 70 Gooseberry Hill Rd., Gooseberry Hill, Western Australia, 6076 (AU); James Edward Salisbury, 16 Pengana Crescent, Mollymook, New South Wales, 2539 (AU)

( * ) Notice: Subject to any disclaimer, the term of this patent is extended or adjusted under 35 U.S.C. 154(b) by 0 days.

(21) Appl. No.: 10/204,032
(22) PCT Filed: Feb. 15, 2001
(86) PCT No.: PCT/AU01/00144
§ 371 (c)(1),
(2), (4) Date: Sep. 25, 2002
(87) PCT Pub. No.: WO01/60690
PCT Pub. Date: Aug. 23, 2001

(65) Prior Publication Data
US 2003/0040236 A1 Feb. 27, 2003

(30) Foreign Application Priority Data
Feb. 18, 2000 (AU) .......... PQ 5692

(51) Int. Cl.$^7$ .......... B63B 35/73
(52) U.S. Cl. .......... 441/79; 114/39.15; 114/67 R; 114/274
(58) Field of Search .......... 114/288, 290, 114/67 R, 126, 274, 125, 39.15; 441/65, 79, 74

(56) References Cited

U.S. PATENT DOCUMENTS 3,089,157 A    5/1963    May .............. 9/310

FOREIGN PATENT DOCUMENTS

| AU | 31633 | 7/1971 | .......... B63C/15/05 |
| AU | A-84768/91 | 9/1990 | .......... B63B/39/06 |
| DE | 2922860 | 12/1980 | .......... B63B/35/72 |
| DE | 30 16 927 | 5/1981 | .......... B63B/39/06 |
| GB | 972196 | 6/1962 | |
| GB | 2177353 | 3/1986 | .......... B63B/3/38 |
| JP | 62-244779 | * 10/1987 | .......... 114/126 |
| WO | WO 99/22986 | 5/1999 | .......... B63B/35/79 |

* cited by examiner

Primary Examiner—Sherman Basinger
(74) Attorney, Agent, or Firm—Duane Morris LLP

(57) ABSTRACT

A hydrodynamic device for use with a recreational water vessel such as a surfboard, disrupts a flow of water under the recreational water vessel. A channel member (12) and a fixing device (14) are attachable to an underside of the recreational water vessel. The fixing device (14) may have lugs (44) arranged to be received in corresponding recesses in the underside of the vessel. Water flowing between the underside of the vessel and the channel member (12) passes from a high water-pressure zone to a low water-pressure zone, which enhances forward thrust of the recreational water vessel in the water.

25 Claims, 4 Drawing Sheets

HYDRODYNAMIC DEVICE

FIELD OF THE INVENTION

The present invention relates to a hydrodynamic device, in particular for use with water vessels.

BACKGROUND OF THE INVENTION

Most recreational water vessels, such as surfboards, bodyboards, windsurfers and the like rely on at least one fin attached to an underside of the water vessel to provide stability to the water vessel when it is in use. Developments in the shape and structure of such fins have gradually improved the performance of these vessels, but few fin designs have enhanced the thrust and turning or steering ability of these vessels in the water.

The present invention seeks to overcome at least some of the aforementioned disadvantages.

SUMMARY OF THE PRESENT INVENTION

In accordance with one aspect of the present invention there is provided a hydrodynamic device for use with a water vessel, comprising a channel member for disrupting a flow of water under the water vessel, the channel member being arranged, in use, to be fixed to an underside of the water vessel with an attachment means, wherein water flowing between the underside of the vessel and the channel member passes from a high water pressure zone to a low water pressure zone thereby enhancing a forward thrust of the water vessel in the water.

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

Figure 1:
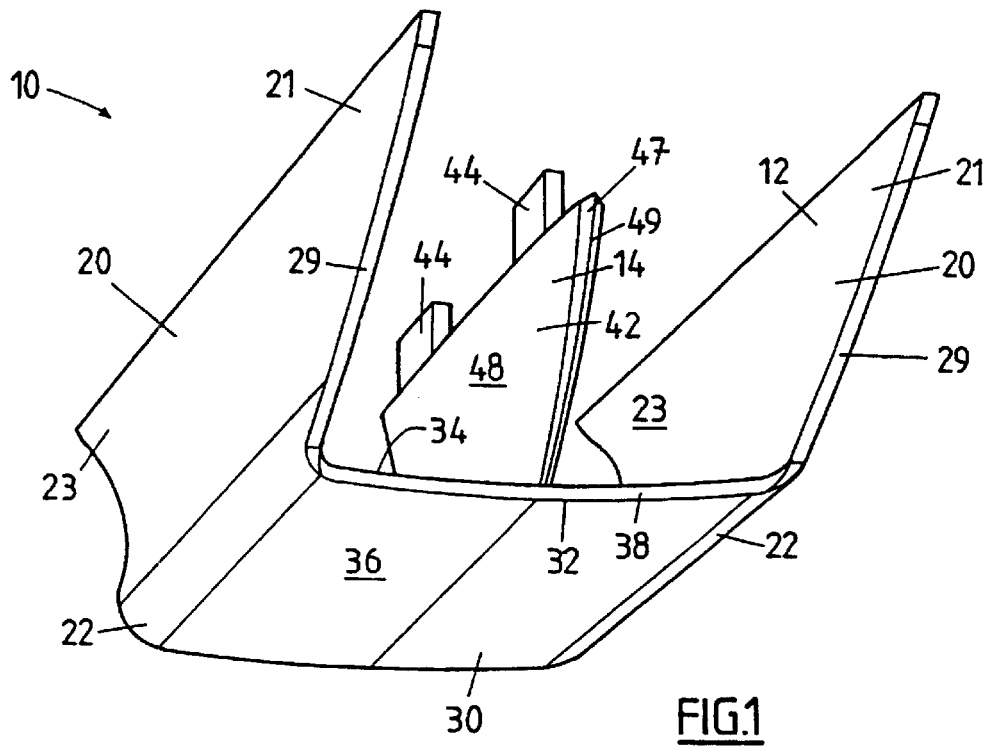
FIG. 1 is a perspective view of a hydrodynamic device in accordance with the present invention.

In FIGS. 1–8 of the accompanying Figures, there is shown a hydrodynamic device 10. The hydrodynamic device 10 is arranged, in use, to be fixed to an underside of a water vessel. In particular, the hydrodynamic device 10 is arranged, in use, to be fixed to the underside of recreational water vessels, preferably surfboards, bodyboards, windsurfers and the like. It is envisaged that the hydrodynamic device 10 will replace a conventional fin on the water vessel.

The hydrodynamic device 10 includes a substantially U-shaped channel member 12 and an attachment means 14 for fixing the channel member 12 to the underside of the vessel. The channel member 12 is longitudinally aligned with and equidistantly spaced from opposing sides of the vessel. The channel member 12 is fixed at any point, including and between, a first point disposed substantially equidistantly spaced from a front end and a rear end of the underside of the vessel and a second point disposed adjacent to the rear end of the underside of the vessel.

The U-shaped channel member 12 includes a pair of opposing side walls 20 and a lower wall 30 interconnecting with, and spanning, a lower portion 22 of each side wall 20 Preferably, the side walls 20 and the lower wall 30 are cambered.

Figure 2:
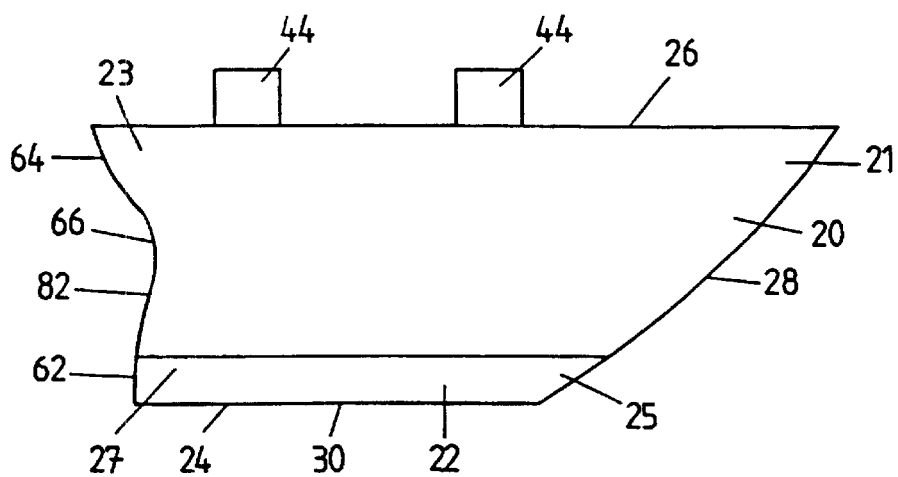
FIG. 2 is a side elevatory view of the hydrodynamic device shown in FIG. 1.
Figure 6:
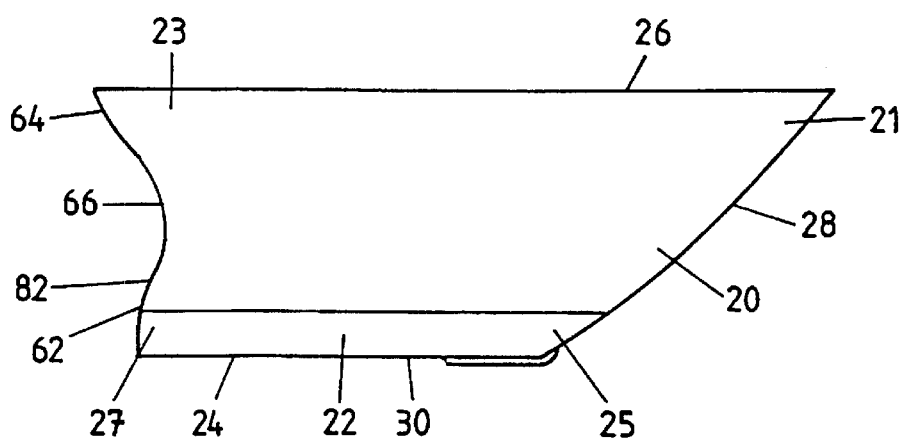
FIG. 6 is a side elevatory view of the hydrodynamic device shown in FIG. 5.
Figure 7:
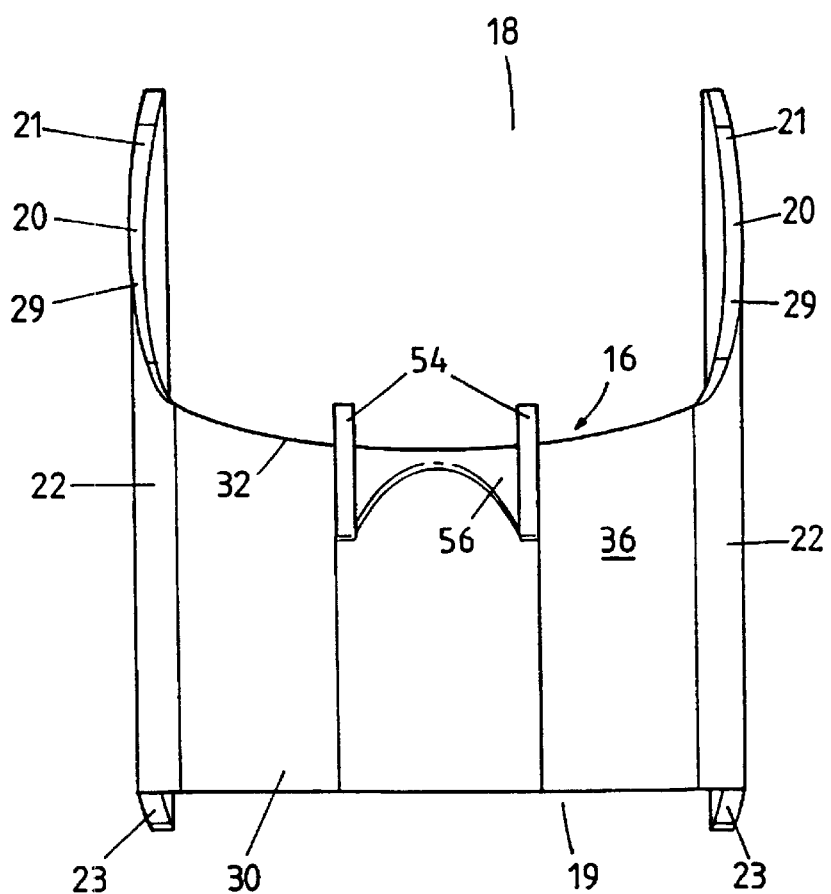
FIG. 7 is a plan view of the hydrodynamic device shown in FIGS. 5 and 6.
Figure 8:
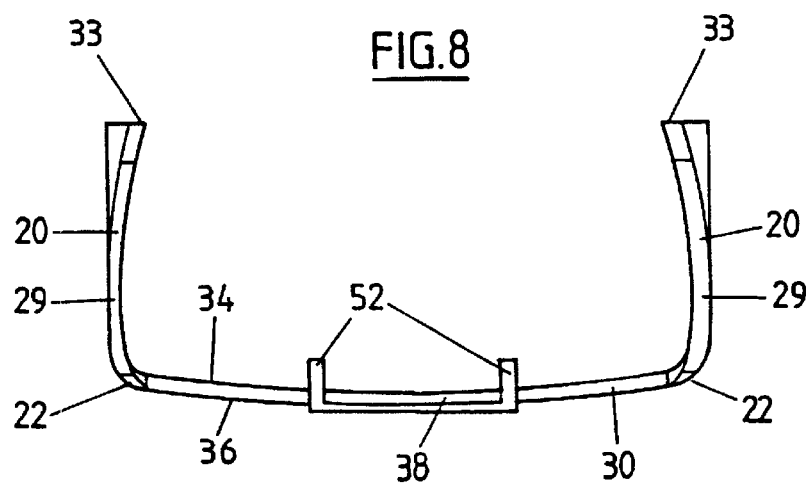
FIG. 8 is a front view of the hydrodynamic device shown in FIGS. 5, 6 and 7.

As shown in FIGS. 2 and 6, each side wall 20 has a fin-like profile The side wall 20 has an upper side 26 disposed parallel with a lower side 24. However, a foremost portion 21 of the upper side 26 extends further forward than a foremost portion 25 of the lower side 24, such that a front side 28 of the side wall 20 is rearwardly and downwardly inclined. Preferably, the front side 28 is slightly convex A front surface 29 of the side wall 20 tapers slightly towards the lower portion 22 of the side wall 20. A rear side 82 of the side wall 20 is provided with a first convex portion 62 disposed adjacent to a rearmost portion 27 of the lower side 24, a second convex portion 64 disposed adjacent to a rearmost portion 23 of the upper side 26, and a concave portion 66 disposed intermediate the first and second convex portions 62, 64 The rearmost portion 23 of the upper side 26 extends further rearward than the rearmost portion 27 of the lower side 24, such that the rearmost portion 23 overhangs the lower wall 30, as shown in FIGS. 2, 3, 6 and 7

It can also be seen from FIGS. 3, 4, 7 and 8 that the foremost portions 21, 25, and in particular the foremost portion 21 of the upper side 22, are curved slightly inwardly towards the corresponding foremost portions 21, 25 of the opposing side wall 20. In this way, a front opening 18 of the channel member 12 is narrower than a rear opening 19 of the channel member 12

Although the lower wall 30 of the channel member 12 is substantially rectangular, it will be evident from FIGS. 1, 3, 5 and 7 that a front side 32 of the lower wall 30 is slightly concave Furthermore, an upper surface 34 of the lower wall 30 overhangs the lower surface 36 of the lower wall 30 at the front side 32 of the lower wall 30, such that a front surface 38 of the lower wall 30 inclines rearwardly of the upper surface 34

The attachment means 14 shown in FIGS. 1–4 comprises a central wall 42 and a plurality of lugs 44 upwardly depending from an upper surface 41 of the central wall 42. Each lug 44 is arranged, in use, to be received in a corresponding recess (not shown) disposed in the underside of the water vessel.

Figure 3:
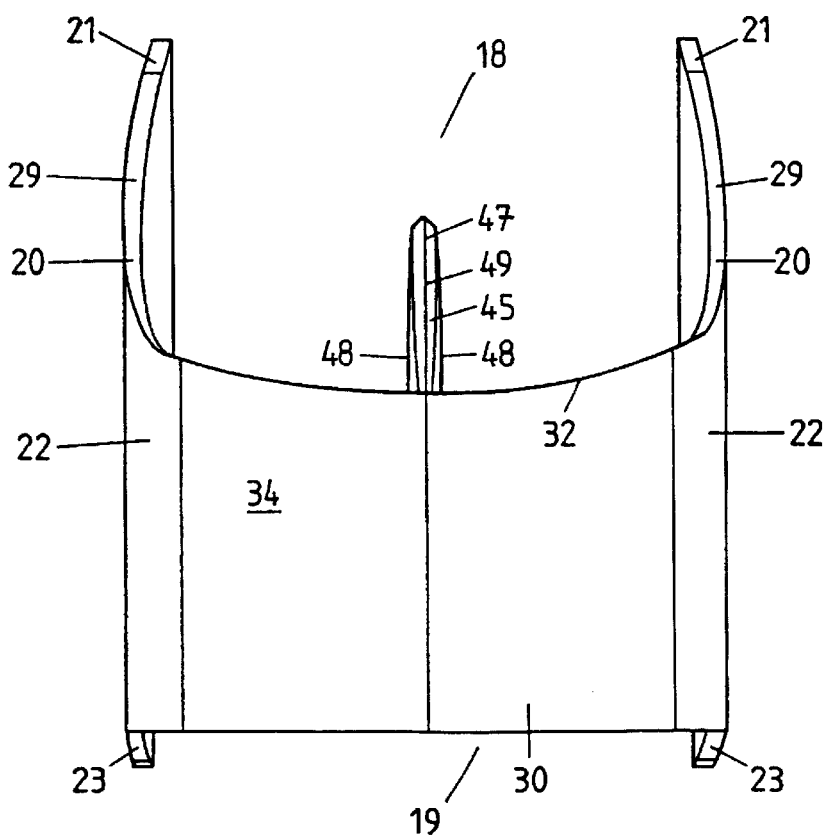
FIG. 3 is a plan view of the hydrodynamic device shown in FIGS. 1 and 2.
Figure 4:
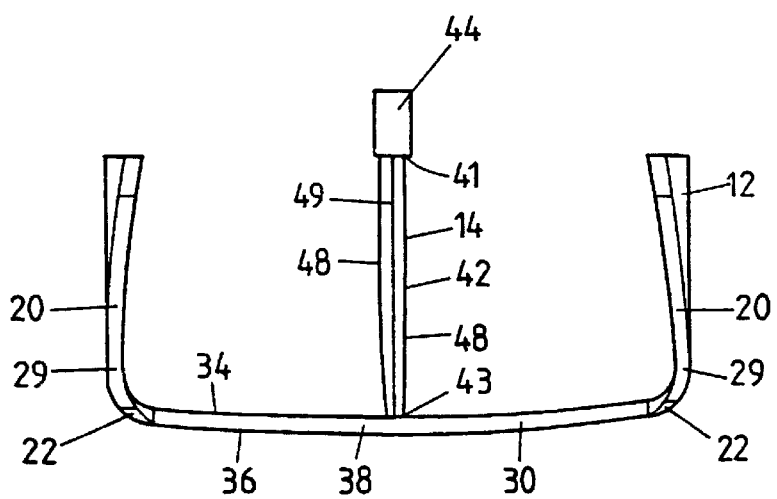
FIG. 4 is a front view of the hydrodynamic device shown in FIGS. 1, 2 and 3.
Figure 5:
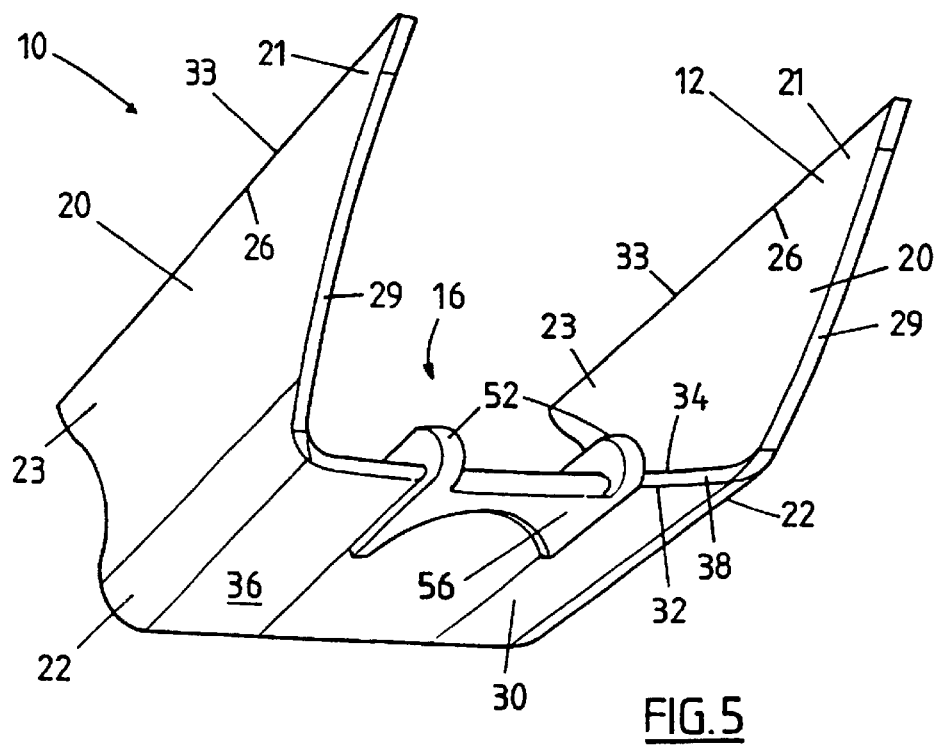
FIG. 5 is a perspective view of a further embodiment of a hydrodynamic device shown in accordance with the present invention.

A lower surface 43 of the central wall 42 is integral with the lower wall 30 of the channel member 12. The central wall 42 is disposed substantially parallel with and equidistantly spaced from the side walls 20 of the channel member 12. A front portion 45 of the central wall 42 projects increasingly forwardly from the lower wall 30, as shown in FIGS. 1 and 3, such that a front surface 47 of the front portion 45 is upwardly curved and overhangs the lower wall 30 The front surface 47 is also tapered to a sharp outwardly extending front edge 49 Opposing surfaces 48 of the central wall 42 are slightly convex and taper slightly from the upper surface 41 to the lower surface 43 of the central wall 42.

The hydrodynamic device 10 shown in FIGS. 5–8 is not provided with a central wall 42 and a plurality of lugs 44 to fix the device 10 to the underside of a vessel Instead, the device is fixed to the underside of the vessel in a desired location by applying a resin mixture to the upper surfaces 33 of the side walls 20 by known means such that the channel member 12 becomes "glassed-on" to the underside of the vessel.

It will be understood that the attachment means may also comprise a snap-lock fitting device, an adhesive or any other known conventional means by which a fin may be attached to the underside of the vessel in the desired location.

Referring to FIGS. 5–8, the channel member 12 is provided with a harmonic damper 16 for dampening vibrations which disrupt the performance of the water vessel in the water. The harmonic damper 16 includes two opposing ribs 52 longitudinally disposed on the upper surface 34 of the lower wall 30. A foremost portion 54 of the ribs 52 protrude forwardly from the front side 32 of the lower wall 30.

The harmonic damper 16 also includes a curved member 56 disposed between the ribs 52 and adjacent to the front side 32 of the lower wall 30 Preferably, the curved member 56 is attached to the lower surface 36 of the lower wall 30 It is envisaged that the curved member 56 will have a very thin thickness, and thus the curved member 56 will be only slightly raised from the lower surface 36.

It is envisaged that the hydrodynamic device 10 will be formed from a low friction material, preferably selected from a group including but not limited to acrylic, glass, carbonite, polyurethane, plastics, nylon, carbon fibre, teflon, and synthetic skin.

It is also envisaged that the hydrodynamic device weighs between 80 g–150 g.

Preferably an outer surface of the hydrodynamic device 10, comprising the lower surface 36 of the lower wall 30 and the respective outer surfaces of the side walls 20, is a polished surface.

Preferably, an inner surface of the hydrodynamic device 10, comprising the upper surface 34 of the lower wall 30, the respective inner surfaces of the side walls 20, and the opposing surfaces 48 of the central wall 42, is a matte surface However, it is envisaged that the inner surface may also be a polished surface.

In use, the hydrodynamic device 10 is fixed to the underside of water vessel by engaging the lugs 44 depending from central wall 42 in corresponding recesses located in the vessel. Alternatively, the upper surfaces 23 of the side walls 20 of the channel member 12 may be "glassed on" to said underside. It is envisaged that any one of several known attachment means may be adapted to fix the device 10 to the desired location on the vessel.

The device 10 becomes submerged in water when the underside of the vessel partially submerged in, or is disposed on the surface of, a body of water.

A portion of water moving relative to the inner surface of the channel member 12 will pass through a high pressure zone as it enters the front opening 18 of the channel member 12. The high pressure zone is located adjacent to the front surfaces 29 of the side walls 20 and the front surface 38 of the lower wall 30.

Similarly, that same portion of the channel member 12 will pass through a low pressure zone as it exits the rear opening 19 of the channel member 12. The low pressure zone is located adjacent the inwardly curved portions 66 of the rear sides 82 of the side walls 20.

The combined effect of the high pressure zone and the low pressure zone located at respective front and rear openings 18, 19 in the channel member 12, and the cambered side walls 20 and the cambered lower wall 30, is to exert decreasing pressure on the portion of water moving from the front to the rear openings 18, 19 of the channel member 12 relative to the device 10. Water enclosed between the device 10 and the underside of the vessel thus behaves as if it is moving in an expansion chamber, resulting in production of water turbulence and thereby the production of forward thrust to the vessel.

Modifications and variations as would be apparent to a skilled addressee are deemed to be within the scope of the present invention.

What is claimed is:

1. A hydrodynamic device to enhance a forward thrust of a recreational water vessel to which said hydrodynamic device is attached, said hydrodynamic device comprising a channel member for disrupting a flow of water under the recreational water vessel, the channel member being arranged in use to be fixed to an underside of the vessel with a device to attach the channel member therewith, the channel member comprising a pair of opposing side walls and a lower wall interconnecting with and spanning a lower portion of each side wall, wherein a foremost portion of each of said side walls is curved slightly inwardly towards a corresponding foremost portion of the opposing side wall so as to provide a front opening of the channel member that is narrower than a rear opening, wherein water flowing between the underside of the vessel and the channel member passes from a high pressure zone proximal to the front opening to a low water pressure zone proximal to the rear opening, such that decreasing pressure is exerted on a portion of water passing through the channel member from the front to the rear opening, thereby enhancing a forward thrust of the recreational water vessel in the water.

2. The hydrodynamic device according to claim 1, wherein the side walls and the lower wall are cambered externally.

3. The hydrodynamic device according to claim 2, wherein the front side of each side wall is slightly convex.

4. The hydrodynamic device according to claim 1, wherein each side wall has a fin-like profile.

5. The hydrodynamic device according to claim 1, wherein a front side of each side wall is rearwardly and downwardly inclined.

6. The hydrodynamic device according to claim 1, wherein a rear side of each side wall is provided with a first convex portion disposed in a lowermost location of the rear side, a second convex portion disposed in an uppermost location of the rear side, and a concave portion disposed intermediate the first and second convex portions.

7. The hydrodynamic device according to claim 6, wherein the second convex portion overhangs the lower wall of the channel member.

8. The hydrodynamic device according to claim 1, wherein a front side of the lower wall is slightly concave.

9. The hydrodynamic device according to claim 8, wherein an upper surface of the lower wall overhangs the lower surface of the lower wall at the front side of the lower wall, such that a front surface of the lower wall inclines rearwardly of the upper surface.

10. The hydrodynamic device according to claim 9, wherein the channel member is longitudinally aligned with and equidistantly spaced from opposing sides of the vessel.

11. The hydrodynamic device according to claim 9, wherein the channel member is provided with a harmonic damper for dampening vibrations.

12. The hydrodynamic device according to claim 11, wherein the harmonic damper includes two opposing ribs longitudinally disposed on an upper surface of the lower wall of the channel member.

13. The hydrodynamic device according to claim 12, wherein a foremost portion of the ribs protrude forwardly from the front side of the lower wall of the channel member.

14. The hydrodynamic device according to claim 12, wherein the harmonic damper further includes a curved member disposed between the ribs and adjacent to the front side of the lower wall.

15. The hydrodynamic device according to claim 14, wherein the curved member is attached to the lower surface of the lower wall.

16. The hydrodynamic device according to claim 15, wherein the harmonic damper further includes a curved member disposed between the ribs and adjacent to the front side of the lower wall.

17. The hydrodynamic device according to claim 1, wherein the channel member is fixed at any point including and between a first point disposed substantially equidistantly spaced from a front end and a rear end of the underside of the vessel and a second point disposed adjacent to the rear end of the underside of the vessel.

18. The hydrodynamic device according to claim 1, wherein the device is formed from a low friction material.

19. The hydrodynamic device according to claim 18, wherein the lower friction material is selected from a group consisting of acrylic, glass, carbonite, polyurethane, plastics, nylon, carbon fiber, Teflon and synthetic skin.

20. The hydrodynamic device according to claim 1, wherein an outer surface of the device is a polished surface.

21. The hydrodynamic device according to claim 1, wherein an inner surface of the device is a matte surface.

22. The hydrodynamic device according to claim 1, wherein the attachment means comprises a central wall disposed substantially parallel with and equidistantly spaced from the side walls of the channel member, and a plurality of lugs upwardly depending from the central wall, wherein each lug is arranged, in use, to be received in a corresponding recess disposed in the underside of the vessel.

23. The hydrodynamic device according to claim 22, wherein a front surface of the central wall projects forwardly of the lower wall of the channel member.

24. The hydrodynamic device according to claim 22, wherein a front surface of the central wall is tapered to a sharp outwardly extending front end.

25. The hydrodynamic device according to claim 22, wherein opposing surfaces of the central wall are slightly convex and taper slightly from an uppermost portion of the central wall to a lowermost portion of the central wall.

* * * * *